(12) United States Patent
Mercure (10) Patent No.: US 10,011,515 B2
(45) Date of Patent: Jul. 3, 2018

(54) GLASS-BREAKING DEVICE AND APPARATUS

(71) Applicant: BROMER INC., Terrebonne (CA)

(72) Inventor: Roger Mercure, Mascouche (CA)

(73) Assignee: BROMER INC., Terrebonne (CA)

( * ) Notice: Subject to any disclaimer, the term of this patent is extended or adjusted under 35 U.S.C. 154(b) by 103 days.

(21) Appl. No.: 15/026,447

(22) PCT Filed: Oct. 3, 2014

(86) PCT No.: PCT/CA2014/050954
§ 371 (c)(1),
(2) Date: Mar. 31, 2016

(87) PCT Pub. No.: WO2015/048902
PCT Pub. Date: Apr. 9, 2015

(65) Prior Publication Data
US 2016/0236963 A1    Aug. 18, 2016

Related U.S. Application Data (60) Provisional application No. 61/886,369, filed on Oct. 3, 2013, provisional application No. 62/047,309, filed on Sep. 8, 2014.

(51) Int. Cl.
| C03B 33/10 | (2006.01) |
| B26D 7/06 | (2006.01) |
| B26F 3/00 | (2006.01) |

(52) U.S. Cl.
CPC ............ *C03B 33/10* (2013.01); *B26D 7/0658* (2013.01); *B26F 3/002* (2013.01)

(58) Field of Classification Search
CPC ........ C03B 33/10; B26F 3/002; B26D 7/0658
See application file for complete search history.

(56) References Cited

U.S. PATENT DOCUMENTS

| | | | | |
|---|---|---|---|---|
| 3,169,683 A | * | 2/1965 | Pierce | B23D 49/167 |
| | | | | 225/103 |
| 3,253,756 A | * | 5/1966 | Haley | C03B 33/033 |
| | | | | 225/2 |
| 3,344,968 A | * | 10/1967 | Kovacik | C03B 33/09 |
| | | | | 225/2 |

(Continued)

FOREIGN PATENT DOCUMENTS

| CA | 1118191 A1 | 2/1982 |
| GB | 1366640 A1 | 9/1974 |

*Primary Examiner* — Sean Michalski
(74) *Attorney, Agent, or Firm* — Norton Rose Fulbright Canada LLP (57) ABSTRACT

An apparatus for breaking glass panels comprises a table having a support surface for supporting a glass panel. A glass-breaking device comprises a frame mounted to the table having a support surface for supporting a glass panel. An impacting tool is operatively connected to the frame, the impacting tool being displaceable between a retracted position in which a tip of the impacting tool is below a plane of the support surface, and an impacting position in which the tip projects above the plane of the support surface to impact a glass panel on the support surface of the table. An actuator is actuatable to cause a displacement of the impacting tool from the retracted position to the impacting position.

52 Claims, 3 Drawing Sheets

(56) References Cited

U.S. PATENT DOCUMENTS

| | | | | |
|---|---|---|---|---|
| 3,424,357 A * | 1/1969 | Huffman | C03B 33/027 | 225/2 |
| 3,601,296 A * | 8/1971 | Pick | H01L 21/00 | 225/103 |
| 3,743,149 A * | 7/1973 | Groppe | C03B 33/03 | 225/2 |
| 3,865,288 A | 2/1975 | Hunsinger et al. | | |
| 4,248,656 A * | 2/1981 | Hofmann | E06B 3/67334 | 100/215 |
| 4,296,542 A * | 10/1981 | Gotman | B28D 5/0029 | 225/94 |
| 4,470,440 A * | 9/1984 | Thor | B27L 7/005 | 144/195.5 |
| 4,693,403 A * | 9/1987 | Sprouse | C03B 33/12 | 125/23.01 |
| 4,834,275 A * | 5/1989 | Kittel | C03B 33/033 | 225/96.5 |
| 4,948,025 A * | 8/1990 | Lisec | C03B 33/033 | 225/104 |
| 5,040,342 A * | 8/1991 | McGuire | B24B 9/107 | 451/38 |
| 5,110,340 A * | 5/1992 | Ikola | C03B 33/033 | 225/103 |
| 5,165,585 A * | 11/1992 | Lisec | C03B 33/033 | 225/105 |
| 5,716,425 A * | 2/1998 | Wolfe | C03B 23/03 | 65/106 |
| 5,857,507 A * | 1/1999 | Puzio | B23D 47/025 | 144/286.1 |
| 6,182,957 B1 * | 2/2001 | Becker | B25B 11/005 | 269/11 |
| 6,460,257 B1 | 10/2002 | Shimotoyodome | | |
| 6,463,762 B1 * | 10/2002 | Ross, Jr. | B65G 49/061 | 225/2 |
| 7,523,846 B2 | 4/2009 | Takamatsu et al. | | |
| 7,888,899 B2 * | 2/2011 | Yeh | B28D 1/26 | 318/560 |
| 8,584,918 B2 * | 11/2013 | Su | B26F 3/002 | 225/23 |
| 8,967,441 B2 * | 3/2015 | Nishikuma | B26F 3/002 | 225/101 |
| 9,375,589 B1 * | 6/2016 | Goodman | A62B 3/005 | |
| 9,586,851 B2 * | 3/2017 | Yao | B26D 7/1863 | |
| 2005/0121486 A1 * | 6/2005 | Chen | B26F 3/002 | 225/96.5 |
| 2007/0158381 A1 * | 7/2007 | Lisec | C03B 33/033 | 225/2 |
| 2012/0241488 A1 * | 9/2012 | Kang | B26F 3/002 | 225/2 |
| 2013/0292444 A1 * | 11/2013 | Roh | C03B 33/033 | 225/103 |
| 2014/0000433 A1 * | 1/2014 | Yamamoto | B26D 5/007 | 83/886 |
| 2015/0158197 A1 * | 6/2015 | Takaichi | H02K 15/03 | 225/3 |

\* cited by examiner

GLASS-BREAKING DEVICE AND APPARATUS

CROSS-REFERENCE TO RELATED APPLICATIONS

The present application claims priority on U.S. Provisional Application Ser. No. 61/886,369, filed on Oct. 3, 2013, and on United States Provisional Application Ser. No. 62/047,309, filed on Sep. 8, 2014.

TECHNICAL FIELD

The present application relates to architectural glass and, more particularly, to a glass-breaking device used in creating arcuate edges of arcuate glass.

BACKGROUND OF THE ART

Architectural glass is increasingly used as a partition wall or as glazing. Indeed, glass of relatively high thickness has the structural integrity to be used as a partition wall. Many reasons explain this popularity of glass as a partition wall, such as its pure look, its ability to let light pass therethrough and its simplicity of installation. Such glass panels are typically found in the rectangular shape, but may also have other shapes with arcuate features, for example.

In order to have a tempered glass with an arcuate edge, a score is made onto one of the sides of the glass panels so as to create a line of weakness. Thereafter, a hammer and chisel or like percussion tools are used to knock excess glass at the score. These tools are still used manually and this may result in imperfections at the resulting arcuate edge, whereby an extensive amount of additional grinding/sanding may be required to obtain suitable arcuate edges.

SUMMARY

It is an aim of the present disclosure to provide automated glass-breaking device and apparatus that address issues associated with the prior art.

Therefore, in accordance with a first embodiment of the present disclosure, there is provided a glass-breaking device comprising: a frame adapted to be mounted to a table having a support surface for supporting a glass panel; an impacting tool operatively connected to the frame, the impacting tool being displaceable between a retracted position in which a tip of the impacting tool is below a plane of the support surface, and an impacting position in which the tip projects above the plane of the support surface to impact a glass panel on the support surface of the table; and an actuator actuatable to cause a displacement of the impacting tool from the retracted position to the impacting position.

Further in accordance with the first embodiment of the present disclosure, the frame comprises a guide body, the impacting tool being operatively connected to the guide body for being guided when displaced between the impacting position and the retracted position.

Still further in accordance with the first embodiment of the present disclosure, the frame has a plate, the plate being adapted to be mounted in a hole in the support surface of the table, the plate having a hole through which the tip of the impacting tool passes to move to the impacting position.

Still further in accordance with the first embodiment of the present disclosure, a top surface of the plate is substantially coplanar to the support surface of the table.

Still further in accordance with the first embodiment of the present disclosure, the frame comprises a frame portion forming a support for the impacting tool in the retracted position, the impacting tool resting on the frame portion by gravity.

Still further in accordance with the first embodiment of the present disclosure, a hammer mass is between the actuator and the impacting tool, the hammer mass being operatively connected to the frame to transmit a force from the actuator to the impacting tool.

Still further in accordance with the first embodiment of the present disclosure, the frame comprises rails, and the hammer mass is operatively mounted to the rails to translate in transmitting the force from the actuator to the impacting tool.

Still further in accordance with the first embodiment of the present disclosure, the actuator is a cylinder, a direction of a shaft of the cylinder being substantially parallel to a direction of translation of the hammer mass and of the impacting tool.

Still further in accordance with the first embodiment of the present disclosure, a resilient bumper on the shaft of the cylinder contacts the hammer mass.

Still further in accordance with the first embodiment of the present disclosure, a gap separates the hammer mass and the actuator from contacting one another when the hammer mass displaces the impacting tool to the impacting position.

Still further in accordance with the first embodiment of the present disclosure, the actuator is a pneumatically actuated cylinder.

Still further in accordance with the first embodiment of the present disclosure, a control controls a force of the actuator, the control having a first force setting, and a second force setting, the second force being greater than the first force.

Still further in accordance with the first embodiment of the present disclosure, the control has an interface with two input interfaces, a first of the input interfaces being related to the first force setting, and a second of the input interfaces being related to a second force setting.

Still further in accordance with the first embodiment of the present disclosure, at least one light source mounted to the frame oriented to emit light adjacent to a pathway of the impacting tool.

Still further in accordance with the first embodiment of the present disclosure, the impacting tool is a chisel.

Still further in accordance with the first embodiment of the present disclosure, actuatable means adjust an orientation of the tip of the impacting tool.

In accordance with a second embodiment of the present disclosure, there is provided an apparatus for breaking glass panels comprising: a table having a support surface for supporting a glass panel; and a glass-breaking device comprising: a frame adapted to be mounted to a table having a support surface for supporting a glass panel; an impacting tool operatively connected to the frame, the impacting tool being displaceable between a retracted position in which a tip of the impacting tool is below a plane of the support surface, and an impacting position in which the tip projects above the plane of the support surface to impact a glass panel on the support surface of the table; and an actuator actuatable to cause a displacement of the impacting tool from the retracted position to the impacting position.

Further in accordance with the second embodiment of the present disclosure, the frame comprises a guide body, the impacting tool being operatively connected to the guide body for being guided when displaced between the impacting position and the retracted position.

Still further in accordance with the second embodiment of the present disclosure, the frame has a plate, the plate being mounted in a hole in the support surface of the table, the plate having a hole through which the tip of the impacting tool passes to move to the impacting position.

Still further in accordance with the second embodiment of the present disclosure, a top surface of the plate is substantially coplanar to the support surface of the table.

Still further in accordance with the second embodiment of the present disclosure, the frame comprises a frame portion forming a support for the impacting tool in the retracted position, the impacting tool resting on the frame portion by gravity.

Still further in accordance with the second embodiment of the present disclosure, a hammer mass is between the actuator and the impacting tool, the hammer mass being operatively connected to the frame to transmit a force from the actuator to the impacting tool.

Still further in accordance with the second embodiment of the present disclosure, the frame comprises rails, and the hammer mass is operatively mounted to the rails to translate in transmitting the force from the actuator to the impacting tool.

Still further in accordance with the second embodiment of the present disclosure, the actuator is a cylinder, a direction of a shaft of the cylinder being substantially parallel to a direction of translation of the hammer mass and of the impacting tool.

Still further in accordance with the second embodiment of the present disclosure, a resilient bumper on the shaft of the cylinder for contact with the hammer mass.

Still further in accordance with the second embodiment of the present disclosure, a gap separates the hammer mass and the actuator from contacting one another when the hammer mass displaces the impacting tool to the impacting position.

Still further in accordance with the second embodiment of the present disclosure, the actuator is a pneumatically actuated cylinder.

Still further in accordance with the second embodiment of the present disclosure, a control controls a force of the actuator, the control having a first force setting, and a second force setting, the second force being greater than the first force.

Still further in accordance with the second embodiment of the present disclosure, the control has an interface with two input interfaces, a first of the input interfaces being related to the first force setting, and a second of the input interfaces being related to a second force setting.

Still further in accordance with the second embodiment of the present disclosure, at least one light source is mounted to the frame oriented to emit light adjacent to a pathway of the impacting tool.

Still further in accordance with the second embodiment of the present disclosure, the impacting tool is a chisel.

Still further in accordance with the second embodiment of the present disclosure, further actuatable means adjust an orientation of the tip of the impacting tool.

Still further in accordance with the second embodiment of the present disclosure, the support surface of the table has a plurality of air holes releasing air.

Still further in accordance with the second embodiment of the present disclosure, the table comprises a plenum, the support surface delimiting a portion of a volume of the plenum such that air released via the plurality of air holes is from the plenum.

DETAILED DESCRIPTION

Figure 1:
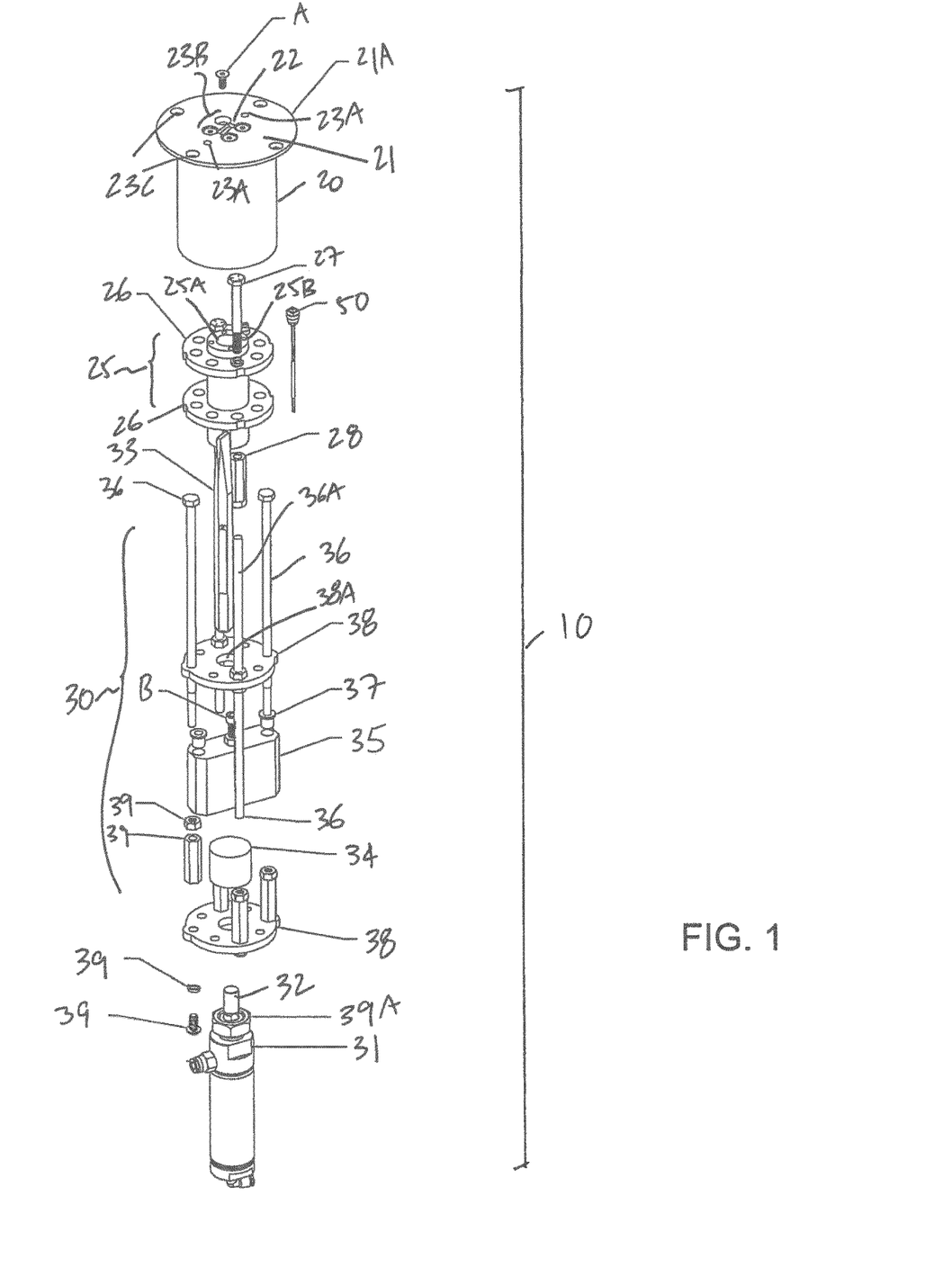
FIG. 1 is a perspective view of a glass-breaking device in accordance with the present disclosure.
Figure 2:
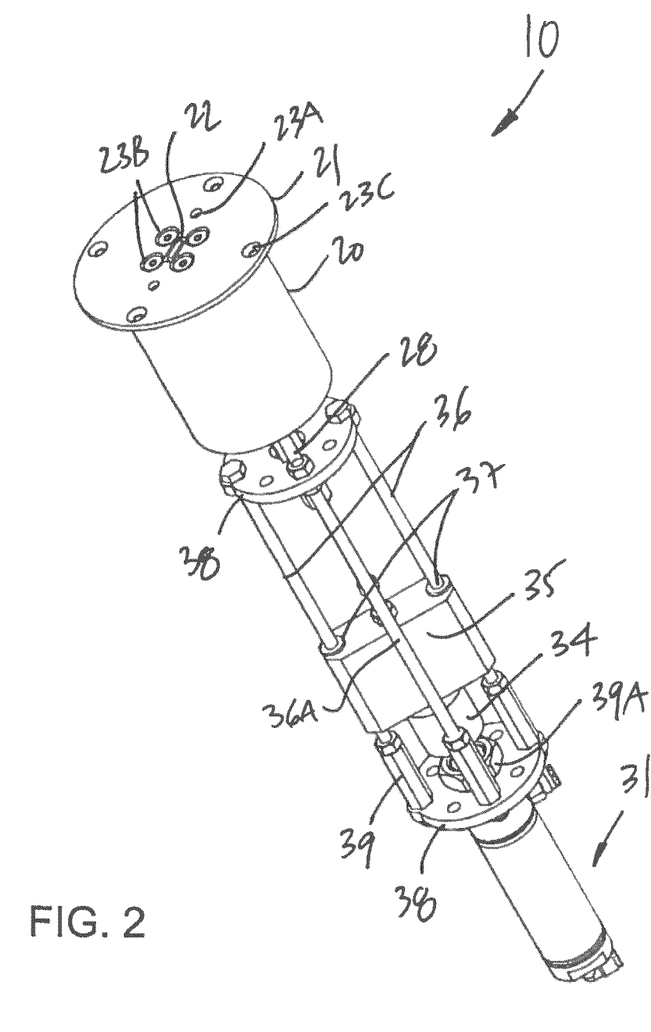
FIG. 2 is a partially sectioned side view of the glass-breaking device of FIG. 1.

Referring to the drawings and more particularly to FIGS. 1 and 2, there is shown an automated glass-breaking device 10 in accordance with the present disclosure. The glass-breaking device 10 is said to be automated, in that the percussion movement results from the action of an actuator, as described hereinafter.

Figure 3:
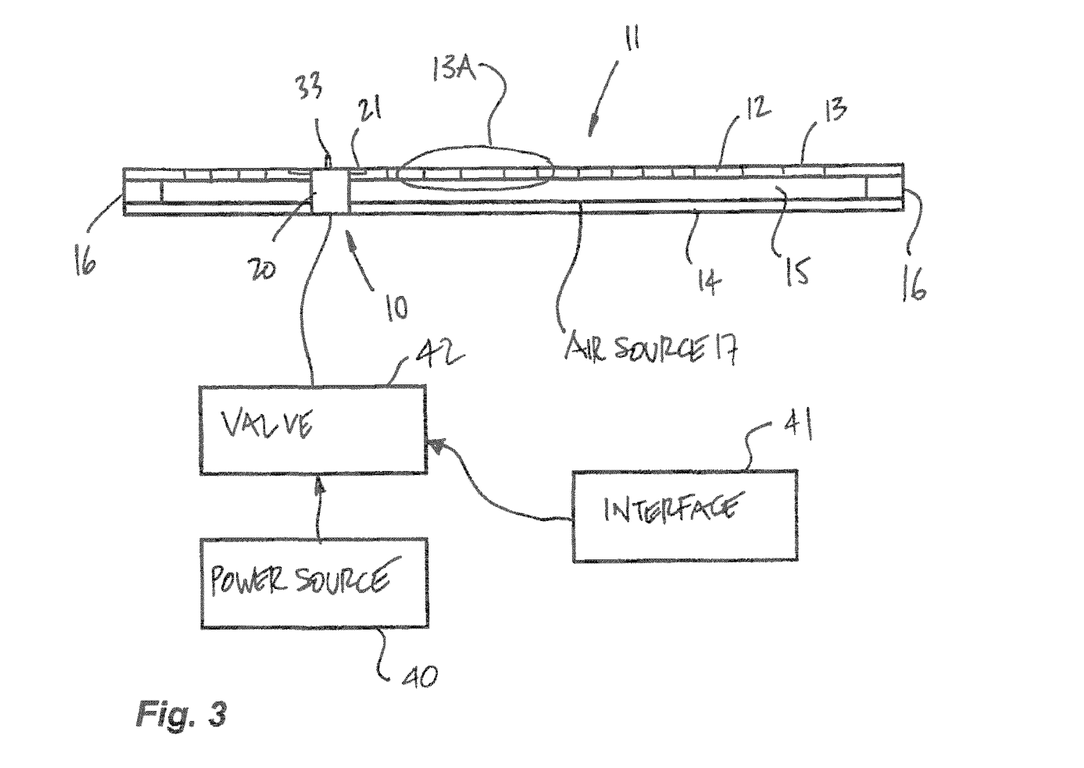
FIG. 3 is a schematic sectional view showing one of these glass-breaking devices 10 as installed on an air table.

Referring to FIG. 3, the glass-breaking device 10 is shown as being installed in an air table 11. While FIG. 3 shows a single one of the glass-breaking devices 10 in the table 11, it is contemplated to have numerous of the glass-breaking devices 10 in the table 11, although a single one of the glass-breaking devices 10 is well suited to perform the glass-breaking maneuvers at the air table 11. The air table 11 is of the type having a top panel 12 defining the top surface 13 that blows air out, such that a glass panel laid on the top surface 13 may be manually pushed around with relative ease. Hence, a plurality of ports 13A are distributed over the top surface 13. The top surface 13 may have a layer of fabric, such as a felt upon which the glass panel will glide as lifted by the air exiting from the ports 13A. Other table configurations are considered, such as more standard conveyor tables, or even standard tables. Table refers herein to any structure having a support plane.

One possible construction for the air table 11 is to have a lower panel 14 spaced apart from the panel 12, thereby defining a plenum 15 therebetween. Spacers 16 interrelate the panel 12 to the panel 14, thereby bounding the plenum 15. An air source 17 blows air into the plenum 15, such that the pressure build-up in the plenum 15 will cause air to escape through the ports 13A. Hence, with the air exiting the ports 13A, a slight lifting effect is performed on a glass panel resting on the top surface 13 of the table 11. Accordingly, an operator may manually push the glass panel around to reach an appropriate position and orientation, such that the score in the glass panel defining the desired edge is aligned with the glass-breaking device 10.

Referring to FIGS. 1 and 2, the glass-breaking device 10 has a body 20. The body 20 is shown as having a cylindrical shape, although other shapes are possible as well. A plate 21 is at the top of the body 20, and extends beyond the body 20 to form a flange 21A. When the glass-breaking device 10 is installed on the table 11, the plate 21 is substantially planar with the top surface 13 so as not to create a protruding edge against which the glass panel gliding on the table 11 could come into contact. Although the body 20 is shown as being in a hole in the table, the body 20 could be at an edge of the table as well. Moreover, although the device 10 is described as having a body 20 and a plate 21, the two parts may be integral to one another (e.g., monolithic, etc). The body 20 and plate 21 are one of numerous solutions to interface the device 10 to the table 11, while providing sufficient structure for the active components of the device 10 to be operable. Numerous alternatives are considered, for instance excluding the body 20, such that the plate 21 supports all components by itself. Likewise, the body 20 may be used without the plate 21, with the body 20 being secured to an underside of the top panel 12 (FIG. 3).

A slot or hole 22 is centrically located in the plate 21, while light holes 23A are on opposite sides of the slot 22. In the illustrated embodiment, the slot 22 has a rectangular shape as the tool is a chisel (as described hereinafter), but other shapes are considered as well, both for the slot 22 and tool. Guide attachment bores 23B are circumferentially distributed in the plate 21, in proximity to the slot 22, while table attachment bores 23C are circumferentially distributed in the plate 21 adjacent to an outer periphery of the flange 21A, for attachment of the flange 21A to the table in the manner described above. It is observed that light holes 23A are diametrically opposed to one another, although other arrangements are considered.

Referring to FIG. 1, a guide 25 is designed to be received in the body 20 of the glass-breaking device 10. The guide 25 has a cylindrical body with a concentric throughbore 25A, and attachment holes 25B at an end. The attachment holes 25B are positioned to be in register with the guide attachment bores 23B of the body 20, for securing the guide 25 to the body 20 with fasteners such as that shown by A. A pair of flanges 26 project radially from the cylindrical body of the guide 25. The flanges 26 have a plurality of circumferentially distributed holes, for connecting the guide 25 to an actuator unit as detailed below, using fasteners 27 and coupling nuts 28. Pin holes may also be provided in the flanges to support light sources.

The glass-breaking device 10 further comprises an actuator unit 30. In the illustrated embodiment, the actuator unit 30 comprises an actuator 31, such as a pneumatic cylinder from which projects a shaft 32. A impacting tool 33 or like impacting portion (e.g., hammer, plunger, finger, etc) is longitudinally aligned with the shaft 32. For simplicity, the impacting tool 33 will be described hereinafter as tool 33. The tool 33 is separated from the shaft 32 by a resilient bumper 34 mounted to the end of the shaft 32, and a hammer hammer mass 35, mounted to rails 36 by bearings 37. The resilient bumper 34 ensures that impacts with the hammer hammer mass 35 are dampened, in the manner described below. Hence, the resilient bumper 34 may consist of a rubbery material of hardness lower than that of the shaft 32, impacting tool 33 and hammer mass 35.

The tool 33 is partly supported by disk frame 38, that holds the tool 33 captive with the tip of the tool 33 in the guide 25. This is achieved by way of hole 38A in the disk frame 38. The hole 38A is large enough to allow a bottom end of the tool 33 to extends downwardly through the hole 38A. An enlargement of the tool 33 however abuts against a top surface of the disk frame 38, preventing the tool 33 from moving further down. The tool 33 is free to move up and down from the lower position shown in FIG. 2, with the enlargement of the tool 33 abutting the top surface of the disk frame 38, and an upper position in which the tip of the tool 33 extends above a surface of the plate 21 (or above the top surface 13 of the table 11) to impact a glass panel. Because of the effect of gravity, the tool 33 is normally in the position of FIG. 2.

The hammer hammer mass 35 may be used to replicate a manual impacting of the tool 33 against the glass panel. The hammer hammer mass 35 has a non-negligible mass, so as to gain sufficient momentum in an upward direction following contact with the resilient bumper 34, to transmit suitable force to the tool 33. The hammer mass 35 is therefore operatively mounted to the rails 36 by sleeve bearings 37. The rails 36 are connected to an upper one of the disk frames 38, and to a lower one of the disk frames 38 at a lower end, via fasteners sets 39. The lower disk frame 38 supports the actuator 31, by way of a threaded collar of the actuator upon which nut 39A is mounted. The upper one of the disk frames 38 is connected to a lower one of the flanges 26, by rods 36A. The rods 36A have opposed threaded ends, to respectively be connected to the fasteners 27 and coupling nuts 28 at an upper end, and to fasteners 39 on the lower disk frame 38. Hence, the various components may be assembled as described above into the assembly shown in FIG. 2. The arrangement described above is one of numerous arrangements that may be sued to support an actuator relative to a table.

The cylinder 31, shaft 32, impacting tool 33, bumper 34 and hammer mass 35 are dimensioned such that a tip of the impacting tool 33 may project above a top plane of the plate 21, with set screw B optionally provided to adjust the height of impacting tool 33 beyond the plane of the table 11. Accordingly, when the glass-breaking device 10 is installed in the table 11, the tip of the impacting tool 33 may project above a plane of the top surface 13 and thus impact the glass panel lying on the top surface 13 of the table 11.

In operation, the tool 33 is in the position of FIG. 2, resting against the upper disk frame 38 with its impacting tip being below the top surface 13 of the table 11. The hammer mass 35 is also at a low position, and is thus distanced from the impacting tool 33. When the score of the glass panel is aligned with the slot or hole 22 (for instance as guided by light), the cylinder 31 is actuated such that the bumper 34 at the end of the shaft 32 propels the hammer mass 35 upwardly. The stroke of the cylinder 31 may be limited, such that the hammer mass 35 propelled upwardly loses contact with the bumper 34 at some point in its upward motion. The hammer mass 35, guided by its connection to the rails 36, moves upwardly to contact the bottom end of the tool 33. Due to the momentum of the hammer mass 35 and its mass, the tool 33 will be pushed in an upward direction, whereby the tip of the tool 33 strikes the glass panel and fractures it at the score. In the illustrated embodiment, at the moment of contact between the tip of the tool 33 and the glass panel, the upward pathway of motion of the tool 33 entirely results from the upward momentum of the hammer mass 35 and of the tool 33, as the hammer mass 35 is no longer in contact with the shaft 32/bumper 34. Stated differently, there is a gap separating the hammer mass 35 and the shaft 32 of the actuator 31 from contacting one another, when the hammer mass 35 displaces the impacting tool 33 to the impacting position. Hence, the deceleration of the tool 33 is not decreased by upward forces from the shaft 32/bumper 34. This arrangement, while being an optional feature, is well suited to avoid excessive forces to be applied to the glass panel. The arrangement may result in a thwack emulating a human hammering on a chisel.

The resistance of the glass panel and gravity result in the tool 33 and the hammer mass 35 moving back downwardly after impact. The tool 33 is stopped by the upper disk frame 33, while the hammer mass 35 falls onto the bumper 34. The bumper 34 therefore absorbs the impact of the hammer mass 35 and reduces the noise. Moreover, the bumper 34 may augment the life of the hammer mass 35/shaft 32 by resiliently absorbing impact energy.

The above is one of the various ways considered to impact the glass panel. In another embodiment, the tool 33 is part of the shaft 32 of the cylinder 31, with the cylinder 31 being mounted to the table 11 or in close proximity thereof such that the tool 33 projects beyond its top surface 13. In such a case, the course of the tool 33 may be controlled to limit the movement of the tip of the tool 33 beyond the plane of the top surface 13. The intention is to control the impact of the tool 33 on the glass panel.

It is considered to use alternative actuation means instead of the pneumatic cylinder 31. For instance, the actuator unit 30 may comprise a linear actuator that is electrically operated (e.g., screwball linear actuator). Likewise, an hydraulic system may be used as well as other possible actuation means. Moreover, although translational movement is described, it is considered to operate a rotational movement for the impacting tool 33, or a combination of translational and rotational movements. It is observed that a direction of a shaft 32 of the cylinder 31 may be substantially parallel to a direction of translation of the hammer mass 35 and of the impacting tool 33.

In the embodiment in which the actuator unit 30 uses a pneumatic cylinder as actuator 31, an air source 40 (or power source in accordance with the type of actuator unit) is in fluid communication with cylinder 31. The air source 40 is, for instance, a blower, a compressor or a compressed air source. A user interface 41, such as a pedal or lever, is provided in the vicinity of the user so as to actuate the movement leading to percussion with the impacting tool 33. In an embodiment, the user interface 41 has a pair of detents (or like input interfaces), one for a higher-force impact and the other for a lower-force impact (two distinct force settings). The higher-force impact may be used for the initial impact, to ensure that the panel cracks sufficiently at the score. The lower-force impact may be used for the subsequent impacts, the lower force being at a sufficient level for the crack to follow the score. Any appropriate valve 42 is provided to ensure that the forces be as set, and the user interface 41 may have additional knobs to adjust the level of the forces.

In another embodiment, the valve 42 is a reciprocating valve, that will cause a reciprocating or vibrating movement of the impacting tool 33. In an embodiment, the cylinder 31 is spring loaded so as to be in a normally retracted condition, with the tip of the impacting tool 33 being below the surface of the plate 21. When actuated by way of the interface 41 and a resulting feed of air to the cylinder 31, the tip of the impacting tool 33 will move above the plane of the top surface 13 and impact the glass thereon, in its impacting position. By maintaining a pressure on the interface 41, the reciprocating valve 42 will cause a vibration of the impacting tool 33 by which the tip of the impacting tool 33 vibrates in and out of the hole 22. It is also considered to operate the actuator unit 30 without a reciprocating valve 37, but instead have the impacting tool 33 move one stroke for each actuation input by the user.

The interface 41 is also connected to light sources 50. Light sources 50 are positioned in the light holes 23A. The light sources 50 may for instance be LEDs of different colours. Accordingly, when a glass panel has its score generally aligned with the hole 22 so as to operate the hammer 33 thereon, it is possible to turn on either light sources 50 so as to produce light of a distinct colour. In doing so, the score in the glass panel lightens up, to visually aid in the alignment of the score with the hole 22 and thus with the impacting tool 33. For this purpose, it is considered to provide a contrasting colour for the top surface of the plate 21. Moreover, a single colour could be used, even a single light source and hole. Likewise, if suitable environing lighting is available, the light 50 may not be necessary.

Once the alignment is reached between the score in the glass panel and the hole 22 as aided by the light emission, the interface 41 is used to actuate the cylinder 31, whereby the impacting tool 33 will impact the glass panel at the score, or near the score, as desired by the user. As the score is aligned with the tip of the impacting tool 33, the point of weakness defined thereby will result in cracks aligned with the score in the glass panel. Once a crack appears, the actuator unit 30 may be turned off so as to further displace the glass panel on the air table 11 to align a further location of the score with the hole 22. This is done repeatedly along the score until the excess portion of the glass panel fragments off or may be broken off.

It is observed that a direction of movement of the impacting tool 33 is substantially normal to a plane at the glass panel. As a result, the impact may cause generally straight fractures along the score.

The actuation unit 30 is described as being actuated by a power source. However, it is possible to use manual actuation to displace the impacting portion 33. For instance, a pedal with transmission could be used as means to displace the impacting portion 33.

In yet another embodiment, the interface 41 and the valve 42 are used to adjust an orientation of the impacting portion 33, especially if the impacting portion 33 has an orientation, such as when the impacting portion 33 is a chisel.

The invention claimed is:

1. An apparatus for breaking glass panels comprising:
    a table having a support surface for supporting a glass panel; and
    a glass-breaking device comprising:
        a frame mounted to the table, the frame including rails;
        an impacting tool operatively connected to the frame, the impacting tool being displaceable between a retracted position in which a tip of the impacting tool is below a plane of the support surface, and an impacting position in which the tip projects above the plane of the support surface to impact a glass panel on the support surface of the table;
        an actuator actuatable to cause a displacement of the impacting tool from the retracted position to the impacting position; and
        a hammer mass between the actuator and the impacting tool, the hammer mass being operatively connected to the frame to transmit a force from the actuator to the impacting tool, the hammer mass being operatively mounted to the rails to translate in transmitting the force from the actuator to the impacting tool.

2. The apparatus according to claim 1, wherein the frame comprises a guide body, the impacting tool being operatively connected to the guide body for being guided when displaced between the impacting position and the retracted position.

3. The apparatus according to claim 1, wherein the frame has a plate, the plate being mounted in a hole in the support surface of the table, the plate having a hole through which the tip of the impacting tool passes to move to the impacting position.

4. The apparatus according to claim 3, wherein a top surface of the plate is substantially coplanar to the support surface of the table.

5. The apparatus according to claim 1, wherein the frame comprises a frame portion forming a support for the impacting tool in the retracted position, the impacting tool resting on the frame portion by gravity.

6. The apparatus according to claim 1, wherein the actuator is a cylinder, a direction of a shaft of the cylinder being substantially parallel to a direction of translation of the hammer mass and of the impacting tool.

7. The apparatus according to claim 6, further comprising a resilient bumper on the shaft of the cylinder for contact with the hammer mass.

8. The apparatus according to claim 1, further comprising a gap separating the hammer mass and the actuator from contacting one another when the hammer mass displaces the impacting tool to the impacting position.

9. The apparatus according to claim 1, further comprising a control to control a force of the actuator, the control having a first force setting, and a second force setting, the second force being greater than the first force.

10. The apparatus according to claim 9, wherein the control has an interface with two input interfaces, a first of the input interfaces being related to the first force setting, and a second of the input interfaces being related to a second force setting.

11. The apparatus according to claim 1, further comprising at least one light source mounted to the frame oriented to emit light adjacent to a pathway of the impacting tool.

12. The apparatus according to claim 1, wherein the impacting tool is a chisel.

13. The apparatus according to claim 1, further comprising actuatable means to adjust an orientation of the tip of the impacting tool.

14. The apparatus according to claim 1, wherein the support surface of the table has a plurality of air holes releasing air.

15. The apparatus according to claim 14, wherein the table comprises a plenum, the support surface delimiting a portion of a volume of the plenum such that air released via the plurality of air holes is from the plenum.

16. An apparatus for breaking glass panels comprising:
a table having a support surface for supporting a glass panel; and
a glass-breaking device comprising:
a frame mounted to the table;
an impacting tool operatively connected to the frame, the impacting tool being displaceable between a retracted position in which a tip of the impacting tool is below a plane of the support surface, and an impacting position in which the tip projects above the plane of the support surface to impact a glass panel on the support surface of the table;
an actuator actuatable to cause a displacement of the impacting tool from the retracted position to the impacting position, the actuator being a cylinder, a direction of a shaft of the cylinder being substantially parallel to a direction of translation of the impacting tool;
a hammer mass between the actuator and the impacting tool, the hammer mass being operatively connected to the frame to transmit a force from the actuator to the impacting tool; and
a resilient bumper on the shaft of the cylinder for contact with the hammer mass.

17. The apparatus according to claim 16, wherein the frame comprises a guide body, the impacting tool being operatively connected to the guide body for being guided when displaced between the impacting position and the retracted position.

18. The apparatus according to claim 16, wherein the frame has a plate, the plate being mounted in a hole in the support surface of the table, the plate having a hole through which the tip of the impacting tool passes to move to the impacting position.

19. The apparatus according to claim 18, wherein a top surface of the plate is substantially coplanar to the support surface of the table.

20. The apparatus according to claim 16, wherein the frame comprises a frame portion forming a support for the impacting tool in the retracted position, the impacting tool resting on the frame portion by gravity.

21. The apparatus according to claim 16, further comprising a gap separating the hammer mass and the actuator from contacting one another when the hammer mass displaces the impacting tool to the impacting position.

22. The apparatus according to claim 16, further comprising a control to control a force of the actuator, the control having a first force setting, and a second force setting, the second force being greater than the first force.

23. The apparatus according to claim 22, wherein the control has an interface with two input interfaces, a first of the input interfaces being related to the first force setting, and a second of the input interfaces being related to a second force setting.

24. The apparatus according to claim 16, further comprising at least one light source mounted to the frame oriented to emit light adjacent to a pathway of the impacting tool.

25. The apparatus according to claim 16, wherein the impacting tool is a chisel.

26. The apparatus according to claim 16, further comprising actuatable means to adjust an orientation of the tip of the impacting tool.

27. The apparatus according to claim 16, wherein the support surface of the table has a plurality of air holes releasing air.

28. The apparatus according to claim 27, wherein the table comprises a plenum, the support surface delimiting a portion of a volume of the plenum such that air released via the plurality of air holes is from the plenum.

29. An apparatus for breaking glass panels comprising:
a table having a support surface for supporting a glass panel; and
a glass-breaking device comprising:
a frame mounted to the table;
an impacting tool operatively connected to the frame, the impacting tool being displaceable between a retracted position in which a tip of the impacting tool is below a plane of the support surface, and an impacting position in which the tip projects above the plane of the support surface to impact a glass panel on the support surface of the table;
at least one light source mounted to the frame and oriented to emit light adjacent to a pathway of the impacting tool; and
an actuator actuatable to cause a displacement of the impacting tool from the retracted position to the impacting position.

30. The apparatus according to claim 29, wherein the frame comprises a guide body, the impacting tool being operatively connected to the guide body for being guided when displaced between the impacting position and the retracted position.

31. The apparatus according to claim 29, wherein the frame has a plate, the plate being mounted in a hole in the support surface of the table, the plate having a hole through which the tip of the impacting tool passes to move to the impacting position.

32. The apparatus according to claim 29, wherein the frame comprises a frame portion forming a support for the impacting tool in the retracted position, the impacting tool resting on the frame portion by gravity.

33. The apparatus according to claim 29, further comprising a hammer mass between the actuator and the impacting tool, the hammer mass being operatively connected to the frame to transmit a force from the actuator to the impacting tool.

34. The apparatus according to claim 33, further comprising a gap separating the hammer mass and the actuator from contacting one another when the hammer mass displaces the impacting tool to the impacting position.

35. The apparatus according to claim 29, further comprising a control to control a force of the actuator, the control having a first force setting, and a second force setting, the second force being greater than the first force.

36. The apparatus according to claim 35, wherein the control has an interface with two input interfaces, a first of the input interfaces being related to the first force setting, and a second of the input interfaces being related to a second force setting.

37. The apparatus according to claim 29, wherein the impacting tool is a chisel.

38. The apparatus according to claim 29, further comprising actuatable means to adjust an orientation of the tip of the impacting tool.

39. The apparatus according to claim 29, wherein the support surface of the table has a plurality of air holes releasing air.

40. The apparatus according to claim 39, wherein the table comprises a plenum, the support surface delimiting a portion of a volume of the plenum such that air released via the plurality of air holes is from the plenum.

41. An apparatus for breaking glass panels comprising:
a table having a support surface for supporting a glass panel; and
a glass-breaking device comprising:
a frame mounted to the table;
an impacting tool operatively connected to the frame, the impacting tool being displaceable between a retracted position in which a tip of the impacting tool is below a plane of the support surface, and an impacting position in which the tip projects above the plane of the support surface to impact a glass panel on the support surface of the table;
actuatable means to adjust an orientation of the tip of the impacting tool; and
an actuator actuatable to cause a displacement of the impacting tool from the retracted position to the impacting position.

42. The apparatus according to claim 41, wherein the frame comprises a guide body, the impacting tool being operatively connected to the guide body for being guided when displaced between the impacting position and the retracted position.

43. The apparatus according to claim 41, wherein the frame has a plate, the plate being mounted in a hole in the support surface of the table, the plate having a hole through which the tip of the impacting tool passes to move to the impacting position.

44. The apparatus according to claim 41, wherein the frame comprises a frame portion forming a support for the impacting tool in the retracted position, the impacting tool resting on the frame portion by gravity.

45. The apparatus according to claim 41, further comprising a hammer mass between the actuator and the impacting tool, the hammer mass being operatively connected to the frame to transmit a force from the actuator to the impacting tool.

46. The apparatus according to claim 45, wherein the actuator is a cylinder, a direction of a shaft of the cylinder being substantially parallel to a direction of translation of the hammer mass and of the impacting tool.

47. The apparatus according to claim 45, further comprising a gap separating the hammer mass and the actuator from contacting one another when the hammer mass displaces the impacting tool to the impacting position.

48. The apparatus according to claim 41, further comprising a control to control a force of the actuator, the control having a first force setting, and a second force setting, the second force being greater than the first force.

49. The apparatus according to claim 48, wherein the control has an interface with two input interfaces, a first of the input interfaces being related to the first force setting, and a second of the input interfaces being related to a second force setting.

50. The apparatus according to claim 41, wherein the impacting tool is a chisel.

51. The apparatus according to claim 41, wherein the support surface of the table has a plurality of air holes releasing air.

52. The apparatus according to claim 51, wherein the table comprises a plenum, the support surface delimiting a portion of a volume of the plenum such that air released via the plurality of air holes is from the plenum.

* * * * *